(12) United States Patent
Prosyk et al.

(10) Patent No.: US 6,654,534 B1
(45) Date of Patent: Nov. 25, 2003

(54) ELECTRODE, TERMINATION FOR REDUCED LOCAL HEATING IN AN OPTICAL DEVICE

(75) Inventors: Kelvin Prosyk, Ottawa (CA); Ronald S Moore, Stittsville (CA); Robert Foster, Carp (CA); Marcel Boudreau, Ottawa (CA)

(73) Assignee: Bookham Technology, plc, Abingdon (GB)

( * ) Notice: Subject to any disclaimer, the term of this patent is extended or adjusted under 35 U.S.C. 154(b) by 118 days.

(21) Appl. No.: 09/709,646

(22) Filed: Nov. 13, 2000

(51) Int. Cl.[7] .................................................. G02B 6/10
(52) U.S. Cl. .................................... 385/131; 385/129
(58) Field of Search .......................... 385/40, 41, 129, 385/130, 131, 132

(56) References Cited

U.S. PATENT DOCUMENTS

| | | | | |
|---|---|---|---|---|
| 5,032,879 A | * | 7/1991 | Buchmann et al. | 257/432 |
| 5,098,178 A | * | 3/1992 | Ortabasi | 385/123 |
| 5,179,566 A | * | 1/1993 | Iwano et al. | 385/130 |
| 5,214,723 A | * | 5/1993 | Zamkotsian | 385/132 |
| 5,250,120 A | * | 10/1993 | Takada et al. | 136/256 |
| 5,345,108 A | * | 9/1994 | Kikkawa | 257/736 |
| 5,417,831 A | * | 5/1995 | Koch et al. | 204/283 |
| 5,452,383 A | * | 9/1995 | Takiguchi | 385/131 |
| 5,488,678 A | * | 1/1996 | Taneya et al. | 385/131 |
| 5,719,410 A | * | 2/1998 | Suehiro et al. | 257/750 |
| 5,724,462 A | * | 3/1998 | Ido et al. | 385/14 |
| 5,901,265 A | * | 5/1999 | Tohyama et al. | 385/131 |
| 5,926,585 A | * | 7/1999 | Irikawa et al. | 385/131 |
| 6,044,098 A | * | 3/2000 | Sun | 385/131 |
| 6,100,193 A | * | 8/2000 | Suehiro et al. | 257/29.146 E |
| 6,198,853 B1 | * | 3/2001 | Yamada | 385/131 |

* cited by examiner

Primary Examiner—Michael P. Stafira
Assistant Examiner—Juan D Valentin II
(74) Attorney, Agent, or Firm—Lahive & Cockfield, LLP

(57) ABSTRACT

An optical device, such as an electro-absorption modulator, has a waveguide formed onto a base. Electrodes adjacent the waveguide are used to selectively apply an electric field to the device in order to control the passage of light through the device. To prevent overheating of the device in a region near the point of optical entry, the electrode, which acts as a thermal conduit to dissipate heat from the waveguide is extended over the region. To prevent undesirable electrical contact between the electrode and the region, the normally electrically conducting contact layer between the electrode and the waveguide is removed in that region and replaced by an isolation dielectric.

19 Claims, 7 Drawing Sheets

ELECTRODE, TERMINATION FOR REDUCED LOCAL HEATING IN AN OPTICAL DEVICE

FIELD OF THE INVENTION

The present invention relates to reduction of local heating in an optical device, and particularly reduction of local heating by using a thermally conducting electrode.

BACKGROUND OF THE INVENTION

Devices such as lasers, optical modulators and photo detectors experience heating due to the nature of the physics involved in their operation.

An example in which local heating is problematic occurs in optical modulator devices. An optical modulator such as an electro-absorption modulator includes a waveguide through which light is directed. Light is normally allowed to pass through the device. An electrode on top of the waveguide is used in conjunction with another electrode at the bottom of the device to introduce an electric field in the waveguide. This electric field changes the semiconductor properties so that light passing through the waveguide is absorbed. This absorption of the light results in heating of the device. Overheating of the device will cause breakdown of one or more components and result in failure of the device.

The electrode itself contributes to dissipation of heat in the device. In particular, in a region of the waveguide where the electrode makes contact with the waveguide, the electrode acts as a thermal conductor and creates a thermal path which can carry heat away from that portion of the waveguide thereby reducing the possibility of overheating. However, the electrode does not necessarily extend the entire length of the waveguide as this can have undesirable effects such as increasing capacitance, thereby decreasing the speed at which the modulator reacts. For example, the electrode often does not extend to the point of optical entry of light into the device. In areas not covered by the electrode there is reduced thermal conduction. As a result, heat is not dissipated as efficiently and local overheating of the waveguide in such an area can result in catastrophic failure of the device.

Accordingly, such devices must be used within certain operating limits or constraints such as limiting the amount of optical power that can be delivered in the device, or limiting the amount of electrical bias which can be applied. These constraints can limit the range of applications to which the device can be put, particularly in evolving high power optical networks.

Another problem which exists in such devices is the termination of the electrode. For example, in an InGaAs electro-absorption modulator the electrode can be formed of several layers of metal, including a gold layer. Abrupt termination of the electrode can permit gold to diffuse into the device, rendering it inoperative. Therefore, electrodes in such devices are typically raised at their termination from the semiconductor layer. Although techniques for terminating the electrode in a raised fashion away from the contact layer of the device prevent such diffusion, the requirement to do so is undesirable and increases the complexity of the manufacturing process. A further disadvantage of this termination technique is that the raised portion of the electrode does not serve to conduct heat away from the device.

Overheating also exists in lasers such as the 980 nm pump laser. The 980 nm pump laser is a semiconductor laser having a waveguide which terminates in an exposed cross-section, known as a facet. In particular, overheating is a problem in the vicinity of the facet because the facet forms an interface with the air. A technique to mitigate the interface problem is to specially alter a portion of the waveguide near the facet so that it is not energized or "pumped" and does not act as a laser. The modified portion of the waveguide, for example the first 100 microns of the waveguide from the facet, is known as a window. However, even with this approach, local overheating may still be a problem. Similar to the example of the optical modulator, if an electrode stripe terminates before the facet region, then that region will not does not have an efficient thermal path to conduct heat away.

SUMMARY OF THE INVENTION

Accordingly, it is an object of the present invention to provide a device and method to overcome or mitigate at least one of the disadvantages of previous methods and devices for reducing localized heating in optical devices.

According to an aspect of the present invention, a device for reducing localized heating in an optical waveguide includes an electrode for applying an electrical bias across the optical waveguide and a contact layer for providing an interface or common boundary between the electrode and the optical waveguide. The contact layer has an electrically and thermally conductive first region, and a thermally and non-electrically conductive second region for dissipating heat in a region of localized heating.

According to another aspect of the present invention, the thermally and non-electrically conductive second region, as discussed above, includes an isolation dielectric, such as SiN. The electrode terminates in a terminal end which is in abutting contact with the second region.

According to a further aspect of the present invention, a device for reducing localized heating in an optical waveguide includes a contact layer on the optical waveguide. The contact layer which extends longitudinally along a portion of the waveguide has an electrically and thermally conductive first region, and a thermally and non-electrically conductive second region for dissipating heat in a region of localized heating. A thermally conducting electrode extends longitudinally along the contact layer.

According to a still further aspect of the present invention, there is provided a method for reducing localized heating in a device through which light passes. The device includes a waveguide on a semiconductor substrate. The method includes providing an electrode adjacent the waveguide for applying an electric field. A thermally conducting and electrically conducting region is provided between the waveguide and the electrode in a region of desired electrical contact between the electrode and the waveguide while a thermally conducting and electrically insulating region is provided between the waveguide and the electrode outside the region of desired electrical contact between the electrode and the waveguide.

According to a still further aspect of the present invention, a method of manufacturing a device for controlling light which passes through the device is provided. The method includes providing an optical waveguide on a semiconductor substrate and adding to the surface of the waveguide a contact layer of electrically conducting and thermally conducting material. The contact layer is then masked to define a first region of the contact layer and leaving exposed a second region of the contact layer. The electrically conducting material is then etched away in the exposed region of the contact layer. A blanket deposit of an electrically insulating and thermally conducting material is added to the first region and the etched away second region of the contact layer. Then the second region is masked leaving exposed at least a part of the first region of the contact layer. The electrically insulating and thermally conducting material is etched away in the exposed part of the first region of the contact layer. Metal is then deposited onto the contact layer to form an electrode.

Reduction of local heating according to the present invention permits greater optical power to be delivered to the device. Another advantage is that for a given level of optical input, a higher reverse bias voltage can be used to modulate the light signal thereby permitting increased speed of the device. Accordingly, the device can be used in a greater variety of situations or for a greater variety of purposes as the previously existing operating constraints have been lessened.

BRIEF DESCRIPTION OF THE DRAWINGS

The present invention will be further described, by way of example, with reference to the accompanying drawings in which.

These drawings are not to scale.

DETAILED DESCRIPTION

In digital optical communication, information is communicated using light pulses. To use light to transmit information, light from a source such as a laser is modified by modulating or "shuttering" the light. The modulated light source can then be transmitted along a fibre optic cable as part of a communications system. When the light signal reaches its intended destination, the information carried by the signal is recovered through the process of detection.

Figure 1:
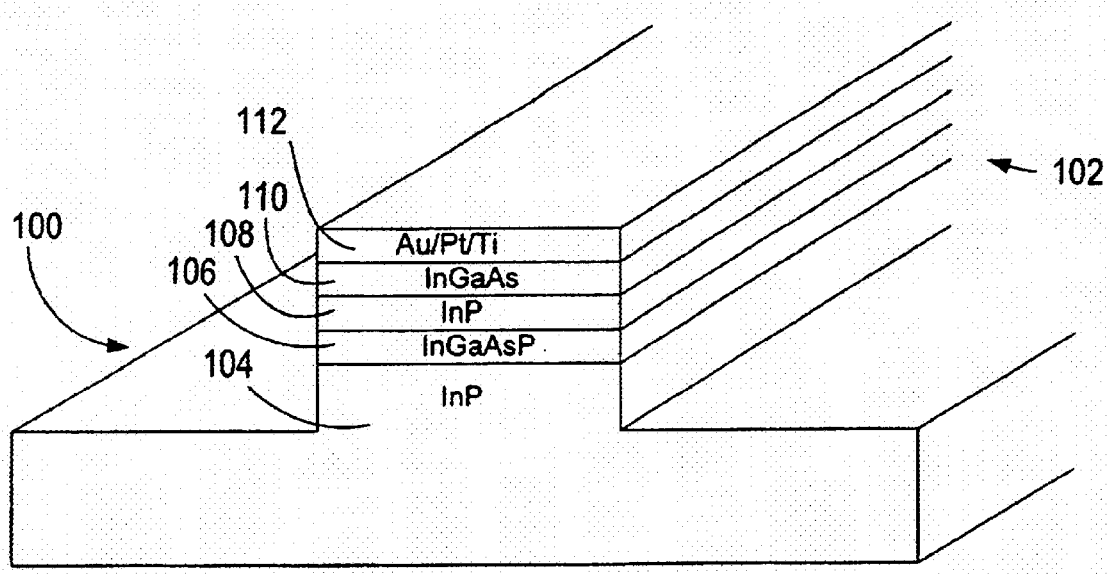
FIG. 1 is a section view illustrating an optical modulator.

Referring to FIG. 1, according to a first embodiment of the present invention, an optical modulator device 100 known as an electro-absorption modulator is shown. The optical modulator device 100 is formed as an integrated circuit or chip having a base 104 formed of a suitable material such as indium phosphide (InP). The optical modulator 100 can be a stand alone unit or it can be monolithically integrated, for example, with another device, or, for example, with an integrated passive waveguiding section.

The base 104 extends into a waveguide 102 through which light either passes or is absorbed. The waveguide 102 can be in the form of a ridge as shown in FIG. 1, or alternatively, it can be buried in a cladding material. Generally, the waveguide 102 is any medium, such as a portion of a semiconductor, in which light is confined and through which light can propagate in a directed manner. The waveguide 102 consists of layers of different materials forming several regions. As illustrated in FIG. 1, an active region 106 composed of indium gallium arsenide phosphide (InGaAsP) is followed by a cladding 108 in this case indium phosphide (InP), which is in turn followed by a contact layer 110 such as indium gallium arsenide (InGaAs). The contact layer 110 acts as an electrical conductor. Above the waveguide 102 is a metallic stripe which forms an electrode 112 and is in contact with the contact layer 110. This electrode 112 cooperates with a metal contact (not shown) beneath the base of a device 100 to permit a reverse electrical bias to be applied to the device 100.

In the absence of a reverse bias, the quarternary composition of the active region 106 acts as a band gap for the light. In other words, light passes freely through the waveguide 102. The introduction of a reverse electrical bias changes the semiconductor properties of the active region 106 so that there is direct material absorption of light in the waveguide 102. If the reverse electrical bias is sufficiently large, the light will effectively be prevented from passing through the device 100. For example, from a base voltage of 0V during normal operation, applying a bias of −2V can extinguish 99% of the light passing through the device 100.

Figures 2, 3:
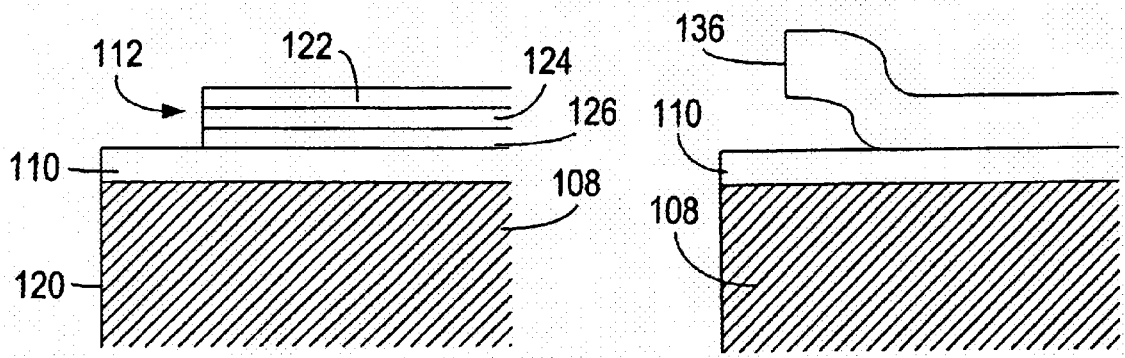
FIG. 2 is a side view of an electrode of the device of FIG. 1.
FIG. 3 is a side view of an electrode terminated away from the contact layer.

Referring to FIG. 2, the electrode 112 does not extend the entire length of the waveguide 102 and ends before the point of optical entry 120 of the laser light. As previously indicated, the region of electrical contact of the electrode 112 is limited to reduce capacitance and other side effects.

Referring to FIG. 2, the electrode 112 of the present device consists of three layers of metal: a gold (Au) layer 122, a platinum (Pt) layer 124 and a titanium (Ti) layer 126. Other combinations of metals are also possible depending on the specific details of the composition of the device 100. The intermediate platinum layer 124 is necessary to prevent gold from diffusing into the device 100 through the InGaAs layer 110 which would render the device 100 inoperative. Under conventional techniques, an abrupt termination of the electrode 112 results in a tapering (not shown) of all three layers (122, 124, 126) of the electrode 112. In particular, at the point of termination or terminal end of the electrode 112, there is potential that the platinum layer 124 tapers away to nothing and the protection afforded by the platinum layer (124) is no longer reliable at the point of termination. Thus it is possible that gold can diffuse into the device 100 through the InGaAs layer 110 rendering the device 100 unreliable or inoperable.

Referring to FIG. 3, one technique for ensuring that gold does not diffuse into the device 100 is to terminate the electrode 112 in a raised fashion away from the device 100. Since the raised terminal end 136 of the electrode 112 does not make contact with the contact layer 110, there is no possibility of gold diffusing into the contact layer 110 from the raised end 136 of the electrode 112. Since the protection of the platinum layer 124 there is unimportant, an abrupt termination of the electrode 112 is acceptable.

In addition to functioning as an electrical path, the electrode 112 also acts as a thermal path for heat within the waveguide 102. Heat generated in the waveguide 102 flows through the contact layer 110 into the metallic electrode 112 where it is carried away. The electrode 112 is typically connected or extended to a massive bond pad (not shown) to which a wire or other electrical contact (not shown) can be made. The electrode 112 also functions to create a thermal path to the relatively massive bond pad which acts as a heat sink for the device 100.

Figure 15:
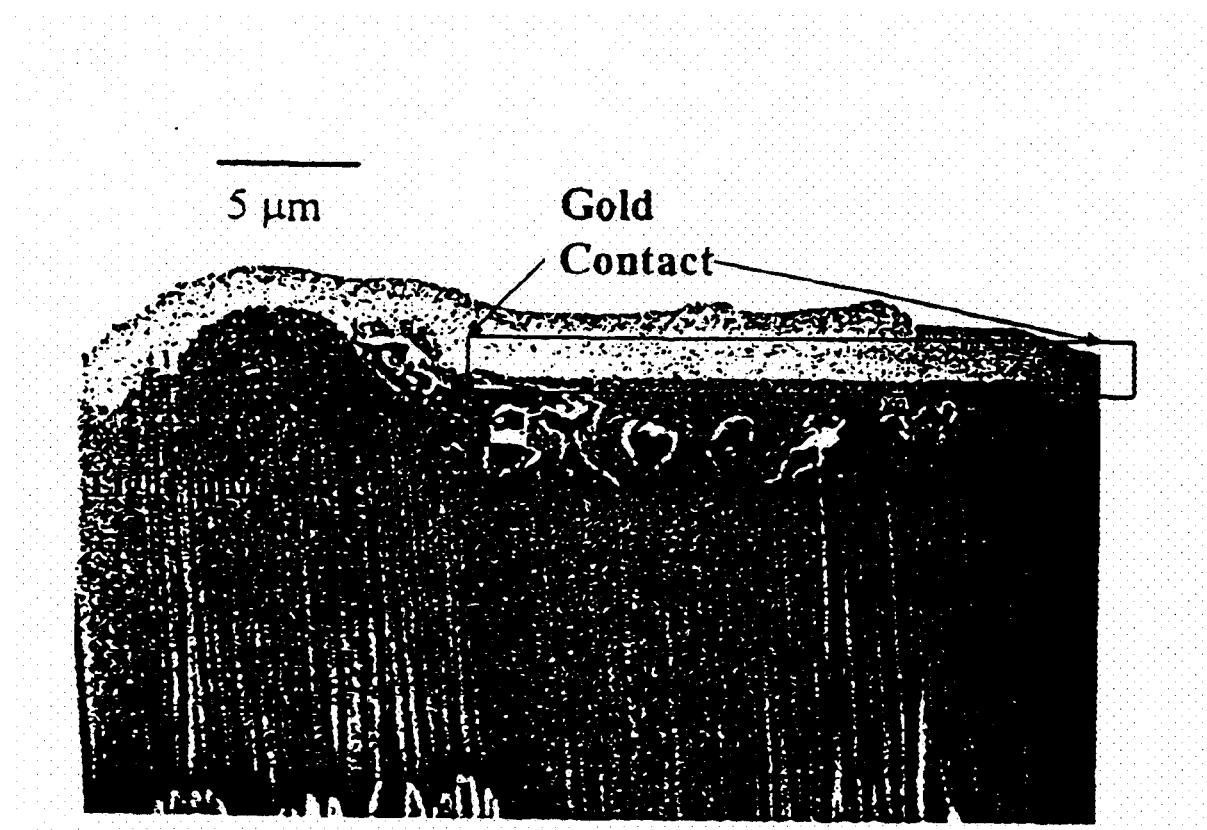
FIG. 15 illustrates catastrophic failure of a prior art device.

As the optical power passing through the device 100 or the voltage of the reverse bias increases, more heat is absorbed by the waveguide 102. Referring to FIG. 15, it has been observed that the location of failure of the device 100 is away from the region of electrical contact of the electrode 112. It has been deduced by analysis and confirmed by experimentation that this problem of local overheating can be ameliorated by providing a thermal path over the region of failure.

Figure 4:
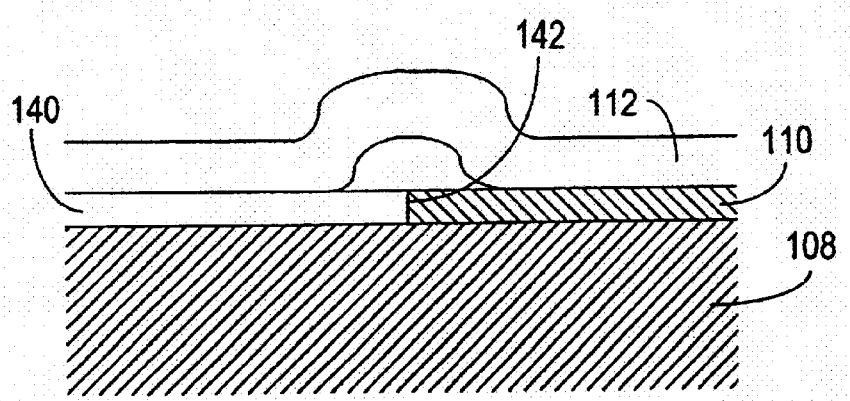
FIG. 4 is a side view of a portion of an optical modulator in accordance with an embodiment of the present invention.

According to the present invention, the electrode 112 is extended beyond the region of desired electrical contact as illustrated in FIG. 4. In order to avoid undesired effects of an extended electrical contact, such as increased capacitance, in a region outside the region of desired electrical contact the electrically conducting contact layer 110 is replaced by an isolation dielectric 140 such as silicon nitride (SiN) or silicon oxynitride in this region. Thus in the region of desired electrical contact the electrode 112 and contact layer 110 provides an electrical path and a thermal path whereas outside the region f desired electrical contact the electrode 112 and SiN layer 140 provide a thermal path but not an electrical path. Accordingly, heat is dissipated from the waveguide 102 beyond the region of electrical contact. In particular, the site of previous failure due to local overheating now has means for dissipating some of the heat. The device 100 in accordance with the present invention can handle greater optical power or alternatively, can operate under a greater reverse electrical bias.

Figure 5:
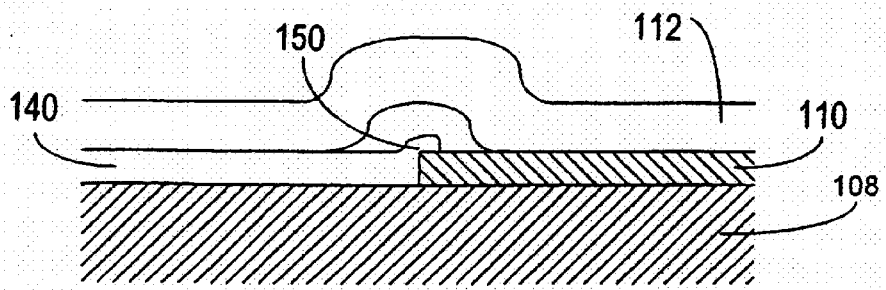
FIG. 5 is a side view of a portion of an optical modulator in accordance with another embodiment of the present invention.

In FIG. 4, the contact layer 110 and isolation dielectric 140 materials are shown as adjacent and abutting at the juncture or common boundary between the materials. However, due to finite mask alignment tolerances, it may be possible that a gap is formed between the two layers exposing a portion of the base layer 100. Referring to FIG. 5, if such a gap is unacceptable, a region of overlap 150 of the contact layer 110 and isolation dielectric 140 materials can be formed during the masking process to ensure complete coverage of the base layer 108 at the juncture or common boundary 142.

Figure 6:
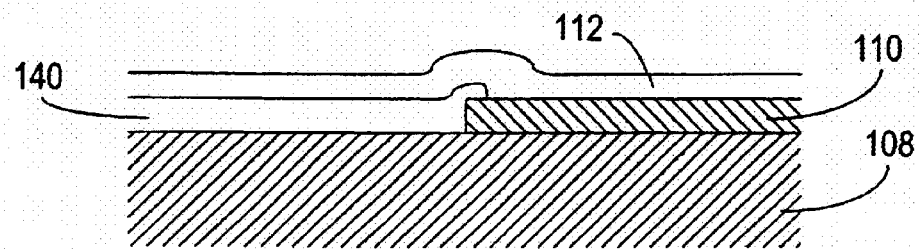
FIG. 6 is a side view of a portion of an optical modulator in accordance with a further embodiment of the present invention.

In FIGS. 4 and 5, the electrode 112 is spaced from the common boundary 142 in an arch which bridges the juncture. This is done to protect the electrode 112 from stress which may occur at that discontinuity. An alternative embodiment is illustrated in FIG. 6, in which the electrode 112 is suitably modified, for example by increasing its thickness or increasing its strength through annealing, and is in continuous contact with the contact layer 110 and isolation dielectric 140 materials over the common boundary 142. This increases the contact of the electrode 112 with the waveguide 102 and prevents or reduces the possibility of a relative hot spot developing below the common boundary 142. This also facilitates the manufacturing process as the extra effort required for construction of the arch is no longer required.

Figure 7:
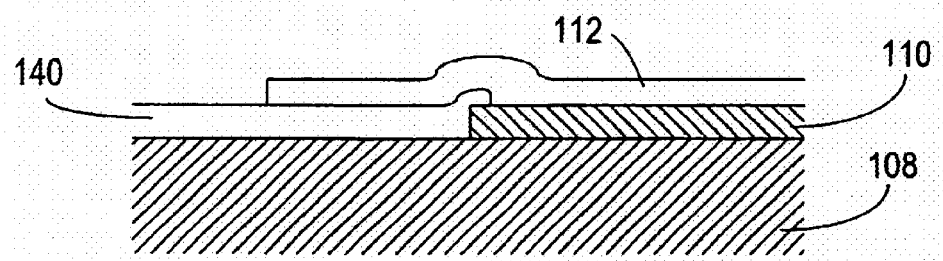
FIG. 7 is a side view of a portion of an optical modulator in accordance with a still further embodiment of the present invention.

A further embodiment of the present invention is illustrated in FIG. 7. According to this embodiment, as previously described, the isolation dielectric, SiN 140 extends beyond the termination of electrode 112 and the termination is not raised. This technique is particularly appropriate where the isolation dielectric 140 is not susceptible to diffusing undesirable metals. For example, since gold cannot permeate SiN, the previously required raised termination technique is no longer required. Thus, the electrode 112 can be abruptly terminated above and adjacent the SiN isolation dielectric 140.

Figure 16:
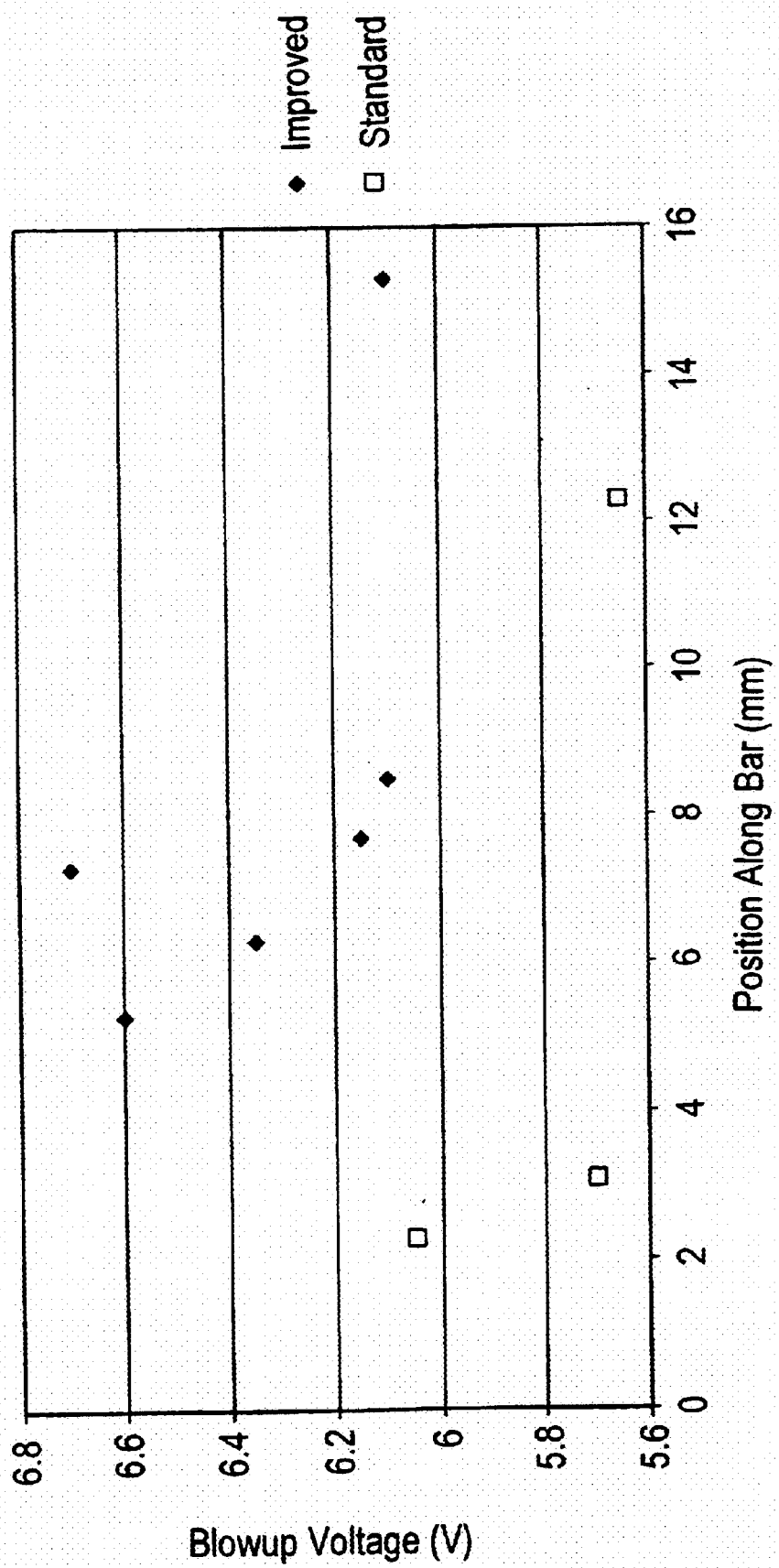
FIG. 16 is a graph indicating experimental results confirming the improved results of the present invention.
Figure 17:
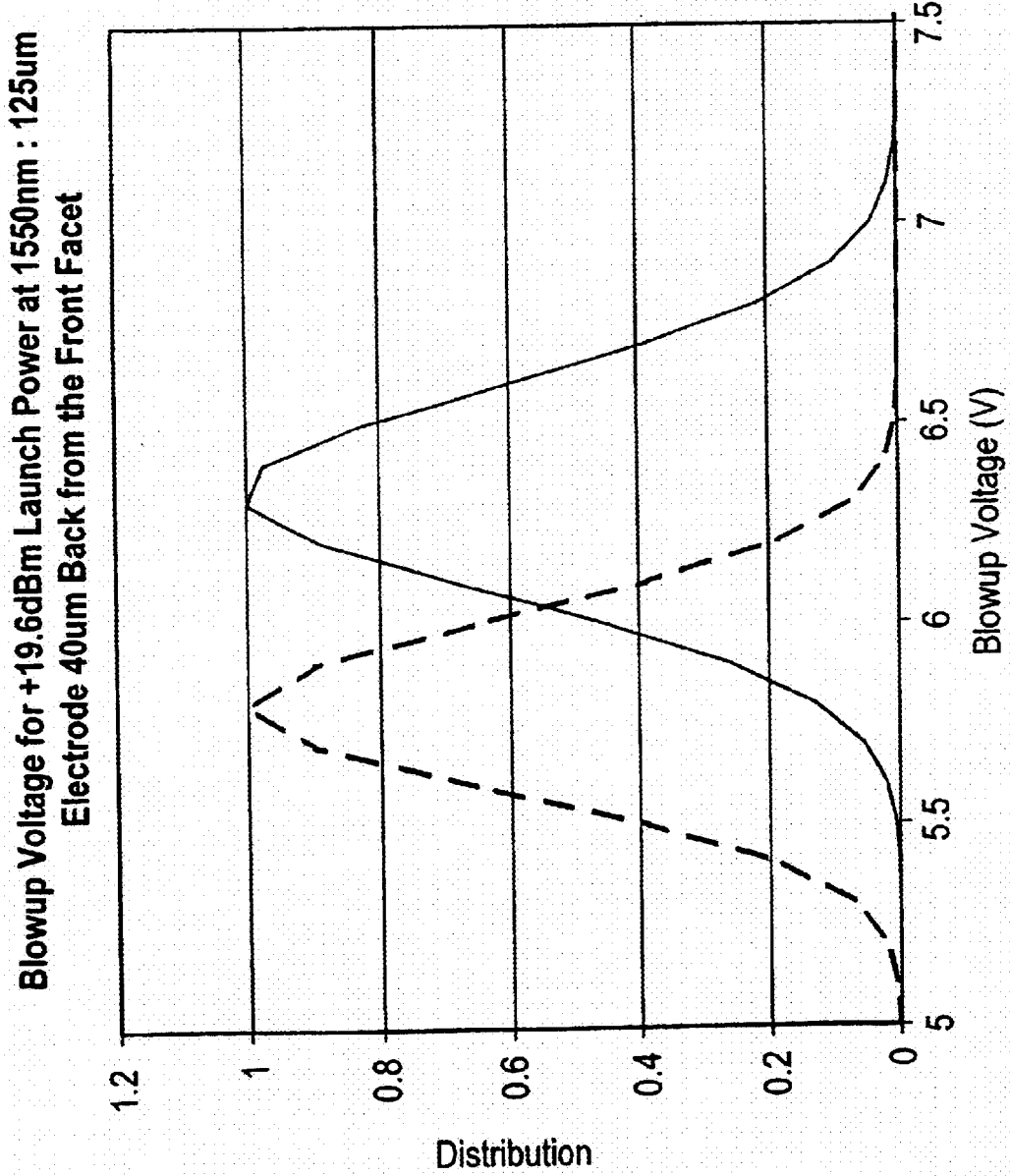
FIG. 17 is a graph indicating a statistical distribution of the experimental results of FIG. 16.

Referring to FIGS. 16 and 17, several conventional electro-absorption modulators were placed along a bar mixed with electro-absorption modulators in accordance with the present invention. This arrangement eliminated any effect from the position of the modulator along the bar. The procedure used in each case was to launch a constant amount of power and to increase the bias voltage in the modulators until the modulators failed. The light was set at 1550 nm with a launch power of 19.6 dBm and the "blowup" voltage for each of the modulators is shown in FIG. 16. The significant improvement in performance afforded by the present invention can be seen in FIG. 17 which shows the statistical distribution of the "blowup" voltage of the conventional devices compared with devices of the present invention.

The previous embodiments of the present invention have been discussed in the context of an electro-absorption modulator in which there is heating of the device due to direct material absorption of light. The present invention is not, however, restricted to such a device.

Figure 8:
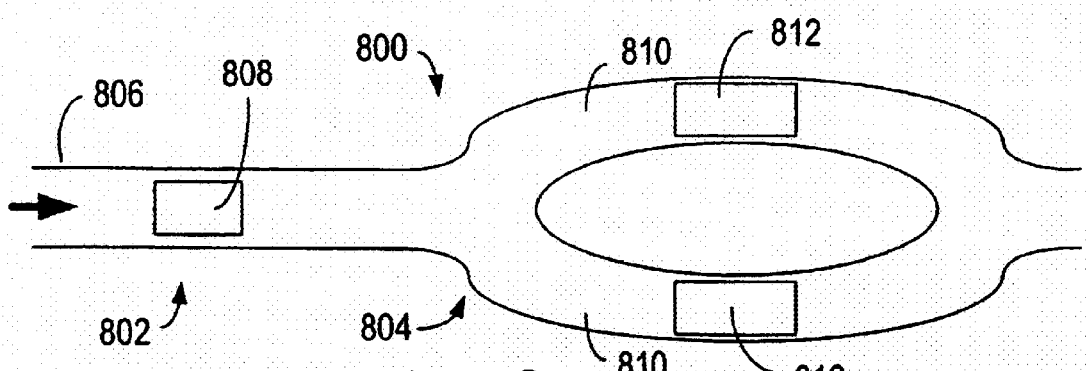
FIG. 8 is a top view illustrating a Mach-Zehnder optical modulator.

For example, referring to FIG. 8, a Mach-Zehnder modulator 800 comprises two portions, an attenuation portion 802 and an interferometer portion 804. Light flows into the modulator 800 in the direction indicated. The attenuator portion 802 includes a straight portion 806 of the waveguide and a semiconductor device 808, employing technology similar to that discussed above for the electro-absorption modulator, to control the strength of the light source introduced into the rest of the device 800.

The interferometer portion 804 includes a bifurcated optical path 810 to split the incoming light. Each arm is provided with a semiconductor device 812 again using known technology similar to that previously discussed, to alter the physical properties of the waveguide. In essence the index of refraction of each arm is modified so that when the separated streams of light merge into a single stream, they can be controlled to constructively or destructively interfere with each other.

The use of the present invention to prevent local overheating in the attenuation portion 802 of the Mach-Zehnder modulator 800 is directly analogous to the examples discussed above. It is less necessary in the interferometer portion 804, since the interferometer uses constructive interference and not direct material absorption to modulate light, and there is relatively little heating due to absorption. Nonetheless, accidental absorption can be a problem and the present invention can be applied to decrease the possibility of local overheating in the interferometer portion 804 as well.

The present invention is not limited to the examples discussed above and is applicable in other devices such as lasers, photo detectors and semiconductor optical amplifiers having a waveguide. In accordance with the present invention, in a manner similar to the previous examples, an electrode of a waveguide in a photo detector or a semiconductor optical amplifier can be extended beyond the region of desired electrical contact with the waveguide while providing a corresponding non-electrically conducting portion of the contact layer to reduce local overheating in the device.

A further application of the present invention relates to its use to improve the functioning of lasers such as the 980 nm pump laser. As discussed above, overheating of a region of the waveguide in the vicinity of the facet is a problem. Extending the electrode of the device beyond the region of desired electrical contact, for example, to an inactive window structure while providing a corresponding non-electrically conducting portion of the contact layer would allow heat to be carried away from the overheated region without making undesired electrical contact with the device.

Figure 9:
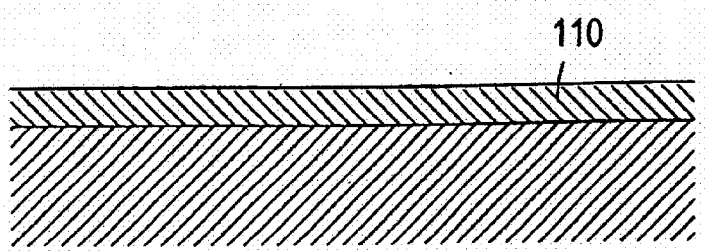
FIG. 9 illustrates a waveguide covered with a contact layer.
Figure 10:
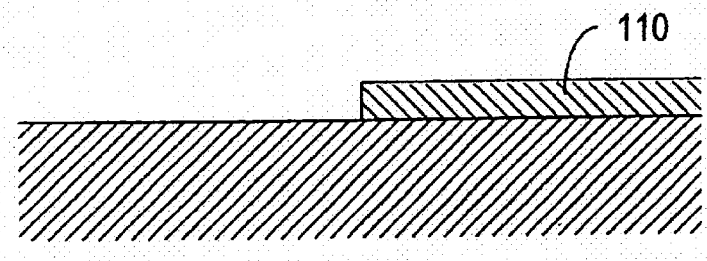
FIG. 10 illustrates a step of removing a portion of the contact layer in accordance with the present invention.
Figure 11:
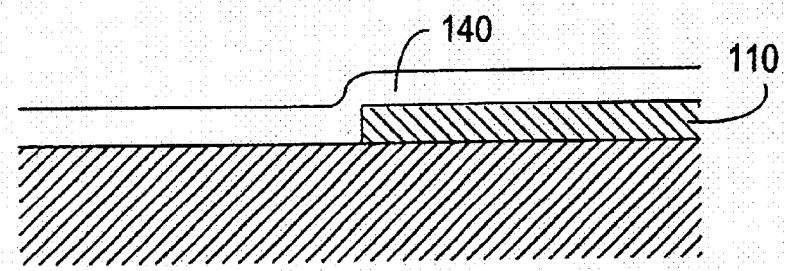
FIG. 11 illustrates a step of a blanket deposition of an isolation dielectric in accordance with the present invention.
Figure 12:
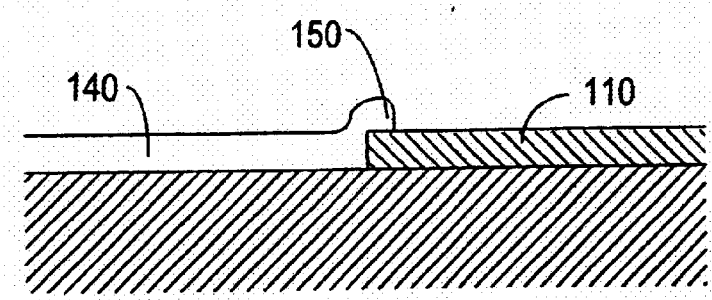
FIG. 12 illustrates a step of removing a portion of the isolation dielectric in accordance with the present invention.
Figure 13:
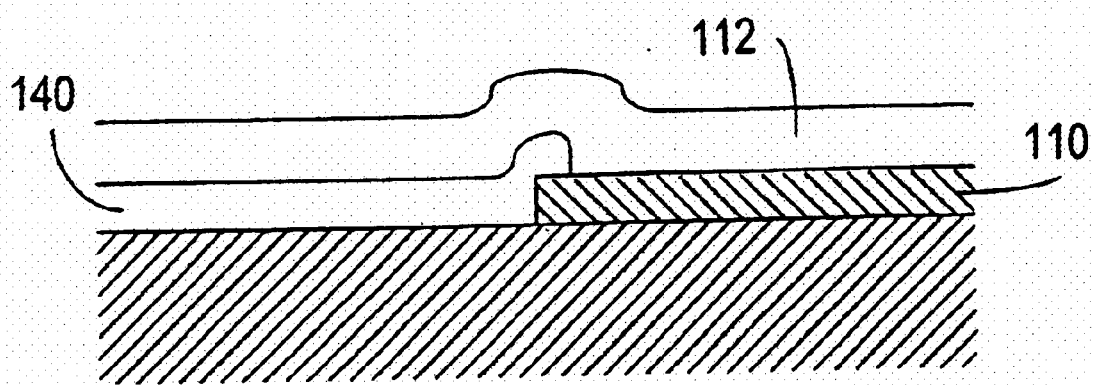
FIG. 13 illustrates a step of adding an electrode stripe in accordance with the present invention.

Constructing the device of the present invention requires additional steps when compared with conventional techniques. Referring to FIG. 9, the method of the present invention begins by providing a waveguide covered with a conventional contact layer 110 of InGaAs. Referring to FIG. 10, this layer 110 is removed by conventional masking and etching techniques in the region outside the region of desired electrical contact. Next, as illustrated in FIG. 11, a blanket deposition of isolation dielectric 140 is made. Next, as illustrated in FIG. 12, a further masking and etching step removes the isolation dielectric 140 from the region of desired electrical contact. An overlap 150 between the two regions can be created as illustrated in FIG. 12, or the two regions can be flush as illustrated in FIG. 4, depending on the masking procedure chosen. Finally, the electrode 112 is deposited on the covered waveguide 102 as illustrated in FIG. 13.

Figure 14:
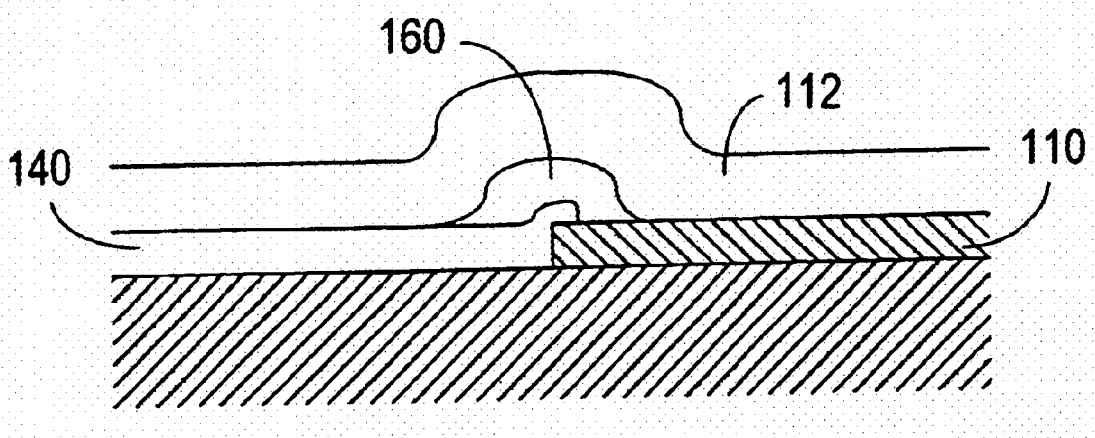
FIG. 14 illustrates an alternative formation of the electrode stripe in accordance with the present invention.

Referring to FIG. 14, if a bridge structure is required, a suitable material, such as PMGI (poly(dimethyl glutarimide)), is used to form a temporary structure before the step of forming the electrode 112. PMGI is a deep UV sensitive material which can be applied and then heated to a plastic state. Because of reflow during heating, it forms a rounded boss 160. The electrode layers are then deposited over the PMGI boss 160 to form the desired arched electrode 112. Finally, the PMGI boss 160 can be dissolved and washed away.

The above described embodiments of the present invention are intended to be examples only. Alterations, modifications, and variations may be effected to the particular embodiments by those of skill in the art without departing from the scope of the invention, which is defined solely in the claims appended hereto.

What is claimed is:

1. A device for reducing localized heating in an optical waveguide, comprising:
    an electrode for applying an electrical bias across the optical waveguide; and
    a contact layer for providing an interface between the electrode and the optical waveguide, the contact layer having an electrically and thermally conductive first region, and a thermally and non-electrically conductive second region for dissipating heat in a region of localized heating, wherein the first region and the second region are adjacent to each other in a single layer.

2. The device of claim 1 wherein the first and second regions of the contact layer meet at a common boundary in abutting contact.

3. The device of claim 1 wherein the second region partially overlaps the first region.

4. The device of claim 1 wherein the electrode adjacent a common boundary between the first and second portions is raised and spaced away from the common boundary.

5. The device of claim 1 wherein the first region includes InGaAs.

6. The device of claim 1 wherein the electrode is multi-layered.

7. The device of claim 6 wherein the electrode includes a gold layer, an intermediate platinum layer and a titanium layer in abutting contact with the contact layer.

8. The device of claim 1 wherein the second region includes an isolation dielectric.

9. The device of claim 8 wherein the isolation dielectric includes SiN.

10. The device of claim 9 wherein a terminal end of the electrode is in abutting contact with the second region.

11. The device of claim 8 wherein the isolation dielectric includes silicon oxynitride.

12. The device of claim 11 wherein the terminal end of the electrode is in abutting contact with the second region.

13. A device for reducing localized heating in an optical waveguide, comprising:
    a contact layer on the optical waveguide having an electrically and thermally conductive first region, and a thermally and non-electrically conductive second region for dissipating heat in a region of localized heating, the contact layer extending longitudinally along a portion of the waveguide; and
    a thermally conducting electrode extending longitudinally along the contact layer, wherein the first region and the second region are adjacent to each other in a single layer.

14. An electro-absorbption modulator, comprising a device for reducing localized heating in an optical waveguide, said device including
    a contact layer on the optical waveguide having an electrically and thermally conductive first region, and a thermally and non-electrically conductive second region for dissipating heat in a region of localized heating, the contact layer extending longitudinally along a portion of the waveguide; and
    a thermally conducting electrode extending longitudinally along the contact layer, wherein the first region and the second region are adjacent to each other in a single layer.

15. A Mach-Zehnder modulator, comprising a device for reducing localized heating in an optical waveguide, said device including
    a contact layer on the optical waveguide having an electrically and thermally conductive first region, and a thermally and non-electrically conductive second region for dissipating heat in a region of localized heating, the contact layer extending longitudinally along a portion of the waveguide; and
    a thermally conducting electrode extending longitudinally along the contact layer, wherein the first region and the second region are adjacent to each other in a single layer.

16. A laser, comprising a device for reducing localized heating in an optical waveguide, said device including
- a contact layer on the optical waveguide having an electrically and thermally conductive first region, and a thermally and non-electrically conductive second region for dissipating heat in a region of localized heating, the contact layer extending longitudinally along a portion of the waveguide; and
- a thermally conducting electrode extending longitudinally along the contact layer, wherein the first region and the second region are adjacent to each other in a single layer.

17. A photo detector, comprising a device for reducing localized heating in an optical waveguide, said device including
- a contact layer on the optical waveguide having an electrically and thermally conductive first region, and a thermally and non-electrically conductive second region for dissipating heat in a region of localized heating, the contact layer extending longitudinally along a portion of the waveguide; and
- a thermally conducting electrode extending longitudinally along the contact layer, wherein the first region and the second region are adjacent to each other in a single layer.

18. A semiconductor optical amplifier, comprising a device for reducing localized heating in an optical waveguide, said device including
- a contact layer on the optical waveguide having an electrically and thermally conductive first region, and a thermally and non-electrically conductive second region for dissipating heat in a region of localized heating, the contact layer extending longitudinally along a portion of the waveguide; and
- a thermally conducting electrode extending longitudinally along the contact layer, wherein the first region and the second region are adjacent to each other in a single layer.

19. A method for reducing localized heating in a device for controlling light passing therethrough, the device comprising a waveguide on a semiconductor substrate, the method comprising:
- providing an electrode adjacent the waveguide for applying an electric field;
- providing a thermally conducting and electrically conducting region between the waveguide and the electrode in a region of desired electrical contact between the electrode and the waveguide; and
- providing a thermally conducting and electrically insulating region between the waveguide and the electrode outside the region of desired electrical contact between the electrode and the waveguide, wherein the thermally conducting and electrically conducting region and the thermally conducting and electrically insulating region are adjacent to each other in a single layer.

* * * * *